United States Patent
Aoki et al.

(10) Patent No.: US 10,344,795 B2
(45) Date of Patent: Jul. 9, 2019

(54) STRUCTURAL BODY FOR SHAFT, MALE MEMBER, AND FEMALE MEMBER

(71) Applicant: NITTA CORPORATION, Osaka (JP)

(72) Inventors: Kenichiro Aoki, Nara (JP); Yoshiharu Kiyohara, Nara (JP); Yoji Ishizaki, Nara (JP); Katsuyuki Nakai, Nara (JP); Yasuhiro Aoki, Nara (JP); Toshihiko Kojima, Nara (JP)

(73) Assignee: NITTA CORPORATION, Osaka (JP)

( * ) Notice: Subject to any disclaimer, the term of this patent is extended or adjusted under 35 U.S.C. 154(b) by 0 days.

(21) Appl. No.: 14/575,901

(22) Filed: Dec. 18, 2014

(65) Prior Publication Data

US 2015/0110551 A1    Apr. 23, 2015

Related U.S. Application Data

(63) Continuation of application No. PCT/JP2013/066556, filed on Jun. 17, 2013.

(30) Foreign Application Priority Data

| Jun. 19, 2012 | (JP) | 2012-137828 |
| Oct. 1, 2012 | (JP) | 2012-219686 |
| Jun. 4, 2013 | (JP) | 2013-117482 |

(51) Int. Cl.
   *F16C 3/03* (2006.01)
   *F16D 3/06* (2006.01)
   (Continued)

(52) U.S. Cl.
   CPC ............ *F16C 3/03* (2013.01); *B62D 1/185* (2013.01); *F16C 29/02* (2013.01); *F16D 1/02* (2013.01);
   (Continued)

(58) Field of Classification Search
   CPC ........ B62D 1/185; F16C 3/03; F16C 2226/80; F16D 1/02; F16D 3/06; F16D 3/185;
   (Continued)

(56) References Cited

U.S. PATENT DOCUMENTS 1,505,694 A * 8/1924 Bentel ................... D06B 3/10
                                                  118/63
2,199,926 A * 5/1940 Swennes ................ F16D 3/76
                                                  403/225

(Continued)

FOREIGN PATENT DOCUMENTS

| CN | 1309749 A | 8/2001 |
| CN | 1606213 A | 4/2005 |

(Continued)

OTHER PUBLICATIONS

Office Action dated Jan. 20, 2016, in Korean Application No. 10-2015-7000663, with English translation, 9 pages.

(Continued)

*Primary Examiner* — Josh Skroupa
(74) *Attorney, Agent, or Firm* — Seed Intellectual Property Law Group LLP

(57) ABSTRACT

A shaft structure installed in a shaft capable of making a power-transmission, the shaft structure including: a male component having a plurality of male splines formed on an outer peripheral part thereof; and a female component having a plurality of female splines formed on an inner peripheral part thereof, the inner peripheral part configured to allow the outer peripheral part of the male component to be engaged therein so that the male component and the female component can be slidably fitted with respect to each other in an axial direction thereby making up said shaft structure, wherein the outer peripheral part of the male component and the inner peripheral part of the female (Continued)

component have a fabric impregnated with rubber or resin interposed therebetween.

8 Claims, 6 Drawing Sheets

(51) Int. Cl.
*F16D 1/02* (2006.01)
*B62D 1/185* (2006.01)
*F16C 29/02* (2006.01)

(52) U.S. Cl.
CPC ............ *F16D 3/06* (2013.01); *F16C 2226/80* (2013.01); *F16D 2300/10* (2013.01); *Y10T 403/7026* (2015.01)

(58) Field of Classification Search
CPC ......... F16D 2001/103; Y10T 403/7026; Y10T 403/7032; Y10T 403/7033; Y10T 403/7035
USPC ....... 403/359.1, 359.4, 359.5, 359.6; 464/16, 464/74, 75, 158, 159, 180
See application file for complete search history.

(56) References Cited

U.S. PATENT DOCUMENTS

| | | | | |
|---|---|---|---|---|
| 2,394,448 | A * | 2/1946 | Herold | F16D 3/68 464/74 |
| 5,880,043 | A | 3/1999 | Lorenz et al. | |
| 6,283,867 | B1 * | 9/2001 | Aota | F16D 3/68 464/158 |
| 6,283,868 | B1 * | 9/2001 | Clarke | F16D 3/74 156/137 |
| 6,428,236 | B2 * | 8/2002 | Aota | F16C 3/03 403/359.5 |
| 6,726,228 | B2 * | 4/2004 | Crawford | B62D 1/10 403/359.1 |
| 7,625,290 | B2 * | 12/2009 | Hodjat | F16D 3/68 464/75 |
| 7,736,083 | B2 * | 6/2010 | Lescure | F01D 5/026 403/359.1 |
| 8,419,555 | B2 * | 4/2013 | Tokioka | B62D 1/185 29/434 |
| 8,753,215 | B2 * | 6/2014 | Tokioka | F16C 3/035 464/162 |
| 2007/0275172 | A1 * | 11/2007 | Cowles | B05D 7/02 427/384 |
| 2009/0291003 | A1 * | 11/2009 | Brown | E21B 43/128 417/410.3 |
| 2010/0303537 | A1 * | 12/2010 | Brown | F16D 1/101 403/14 |
| 2012/0219351 | A1 * | 8/2012 | Besler | F16D 1/02 403/37 |
| 2012/0322566 | A1 * | 12/2012 | Kim | B62D 5/0409 464/88 |

FOREIGN PATENT DOCUMENTS

| | | |
|---|---|---|
| CN | 1681697 A | 10/2005 |
| EP | 1 873 038 A2 | 1/2008 |
| JP | 4-225037 A | 8/1992 |
| JP | 05-157119 A | 6/1993 |
| JP | 2005-117816 | 4/2005 |
| JP | 2007-161165 A | 6/2007 |
| JP | 3958732 B2 | 8/2007 |
| JP | 2008-120250 | 5/2008 |
| JP | 2009-108892 | 5/2009 |
| JP | 2009-257423 | 11/2009 |
| JP | 2011-111112 | 6/2011 |
| JP | 2011-173463 A | 9/2011 |
| JP | 2012-122610 A | 6/2012 |

OTHER PUBLICATIONS

Office Action dated Feb. 16, 2016, in Japanese Application No. 2012-219686, with English translation, 14 pages.
Office Action dated Mar. 2, 2016, in Chinese Application No. 201380032764.2, with English translation, 13 pages.
Office Action dated Aug. 30, 2016, in Taiwanese Application No. 102121743, with English translation, 11 pages.
Chinese Office Action, dated Oct. 8, 2016, for Chinese Application No. 201380032764, 13 pages. (with English Translation).
Korean Office Action, dated Oct. 28, 2016, for Korean Application No. 10-2015-7000663, 7 pages. (with English Translation).
Extended European Search Report, dated Aug. 4, 2016, for European Application No. 13807294.7-1751 / 2863084, 8 pages.
Final Rejection, dated Aug. 29, 2016, for Korean Application No. 10-2015-7000663, 9 pages. (with English Translation).
Japanese Office Action, dated Jan. 27, 2017, for Japanese Application No. 2013-117482, 6 Pages.
Chinese Office Action, dated Apr. 1, 2017, for Chinese Application No. 201380032764.2, 14 pages (with English translation).
Determination of Dismissal of Amendments, dated May 9, 2017, for Japanese Application No. 2012-219686, 12 pages (with English translation).
Japanese Office Action, dated Oct. 4, 2016, for Japanese Application No. 2012-219686, 16 pages (with English translation).
Korean Decision of Refusal, dated Jul. 19, 2017, for Korean Application No. 10-2015-7000663, 19 pages. (with English Translation).
Office Action issued in the corresponding Indian Patent Application No. 46/MUMNP/2015, dated Mar. 28, 2019, 6 pages.

\* cited by examiner

STRUCTURAL BODY FOR SHAFT, MALE MEMBER, AND FEMALE MEMBER

BACKGROUND

Technical Field

The present invention relates to a shaft structure to be installed in shafts used for various industrial machines such as vehicles, and a male component and a female component included in the shaft structure.

Description of the Related Art

Conventionally, there have been publicly well-known telescopic shafts each including male and female spline shafts to be incorporated into, e.g., vehicle steering shafts (see FIG. 2 in Patent Document 1). Such a telescopic shaft has splines formed on an outer surface of the male spline shaft and an inner surface of the female spline shaft. Furthermore, an approximately 0.25 mm thick synthetic resin (nylon or the like) coating is formed on either of the outer surface of the male spline shaft or the inner surface of the female spline shaft.

However, the telescopic shafts generate unpleasant noise, i.e., the so-called tooth-hit noise from between the male and female spline shafts, which are problematic, due to the fact that the dimensional accuracy of such a telescopic shaft is pursued with respect to the splines formed on the outer surface of the male spline shaft or the inner surface of the female spline shaft.

Meanwhile, there has been publicly well-known a torque transmission joint having rubber material such as nitrile rubber, silicone rubber, urethane rubber, and the like disposed in a gap in part between a male spline shaft and a female spline shaft (see FIG. 2 in Patent Document 2). In such a joint, rattling vibrations between the male and female spline shafts are absorbed with the rubber material, thereby resulting in the reduction of rattle noise (tooth-hit noise) generated therebetween.

PRIOR ART DOCUMENTS

Patent Documents

Patent Document 1:
Japanese Patent Application Publication No. 2008-120250 Patent Document 2:
Japanese Patent Application Publication No. 2009-108892

Problems to be Solved

The torque transmission joints described in Patent Document 2 can reduce the rattle noise; however, the rubber material causes a problem that sliding resistance in an axial direction is increased between the male spline shaft and the female spline shaft, which results in decrease in slidability with respect to each other.

BRIEF SUMMARY

The objective of the present invention is to provide a shaft structure, a male component, and a female component capable of reducing unpleasant and abnormal tooth-hit noise while decreasing sliding resistance in an axial direction.

Means for Solving Problems

[1] A shaft structure according to the present invention is characterized in that said shaft structure is installed in a shaft capable of making a power-transmission, and that said shaft structure comprises: a male component having a plurality of male splines formed on an outer peripheral part thereof; and a female component having a plurality of female splines formed on an inner peripheral part thereof, the inner peripheral part configured to allow the outer peripheral part of the male component to be engaged therein so that the male component and the female component can be slidably fitted with respect to each other in an axial direction thereby making up said shaft structure, wherein the outer peripheral part of the male component and the inner peripheral part of the female component have a fabric impregnated with rubber or resin interposed therebetween.

According to the construction of [1] above, by virtue of interposing the fabric impregnated with rubber or resin between the outer peripheral part of the male component and the inner peripheral part of the female component, tooth-hit noise generated therebetween can be reduced while sliding resistance in an axial direction therebetween can be decreased. Furthermore, the improvement of slidability can eliminate the need for lubrication between the outer peripheral part of the male component and the inner peripheral part of the female component, thereby capable of saving expense in time and effort with respect to the need for lubricant supply.

[2] A male component according to the present invention is characterized in that said male component is installed in a shaft capable of making a power-transmission, and is slidably fitted in a female component in an axial direction, and that said male component comprises: a plurality of male splines formed on an outer peripheral part, the outer peripheral part of said male component configured to be engaged in an inner peripheral part of the female component, wherein the outer peripheral part of said male component has a fabric impregnated with rubber or resin disposed thereon.

According to the construction of [2] above, by virtue of disposing the fabric impregnated with rubber or resin on the outer peripheral part of the male component, tooth hit noise generated between the male component and the female component can be reduced while sliding resistance in an axial direction therebetween can be decreased. Furthermore, the improvement of slidability can eliminate the need for lubrication between the outer peripheral part of the male component and the inner peripheral part of the female component, thereby capable of saving expense in time and effort with respect to the need for lubricant supply.

[3] A female component according to the present invention is characterized in that said female component is installed in a shaft capable of making a power-transmission, and is slidably fitted to a male component in an axial direction, and that said female component comprises: a plurality of female splines formed on an inner peripheral part, the inner peripheral part of said female component configured to be engaged to an outer peripheral part of the male component, wherein the inner peripheral part of said female component has a fabric impregnated with rubber or resin disposed thereon.

According to the construction of [3] above, by virtue of disposing the fabric impregnated with rubber or resin on the inner peripheral part of the female component, tooth hit noise generated between the male component and the female component can be reduced while sliding resistance in an axial direction therebetween can be decreased. Furthermore, the improvement of slidability can eliminate the need for lubrication between the outer peripheral part of the male component and the inner peripheral part of the female component, thereby capable of saving expense in time and effort with respect to the need for lubricant supply.

[4] As one aspect of [3] above, the female component may further comprise: a first hole formed on one side of said female component configured to allow the male component to be inserted thereinto in an axial direction; and a second hole formed on the other side of said female component configured to allow a rod-shaped component to be pressed therein in an axial direction and fixed thereto, wherein the first hole may have a first movement stopper disposed therein, the first movement stopper configured to cause the male component to stop moving in an insertion direction before or at a predetermined position when the male component is inserted into the first hole.

[5] As another aspect of [3] above, the female component may further comprise: a third hole formed on one side of said female component configured to allow the male component to be inserted thereinto in an axial direction; and a fourth hole formed on the other side of said female component configured to allow another male component different from the male component to be slidably fitted therein in an axial direction, wherein the third hole may have a second movement stopper disposed therein, the second movement stopper configured to cause the male component to stop moving in an insertion direction before or at a predetermined position when the male component is inserted into the third hole, and the fourth hole may have a third movement stopper disposed therein, the third movement stopper configured to cause said another male component to stop moving in an insertion direction before or at a predetermined position when said another male component is inserted into the fourth hole.

According to the construction of [4] or [5] above, the female component can be used as a component for connecting (coupling) the male component and the rod-shaped component. The movement stoppers, in particular, enable the female component itself to be positioned between the male component and the rod-shaped component.

BRIEF DESCRIPTION OF THE SEVERAL VIEWS OF THE DRAWINGS

For more thorough understanding of the present invention and advantages thereof, the following descriptions should be read in conjunction with the accompanying drawings, in which.

DETAILED DESCRIPTION

Hereinafter, a shaft structure (spline) as well as a male component (male spline shaft) and a female component (female spline shaft), both components making up the shaft structure, in an embodiment of the present invention will be described with reference to FIGS. 1-4.

(Outlined Structure of Electric Power Steering Device)

Figure 1:
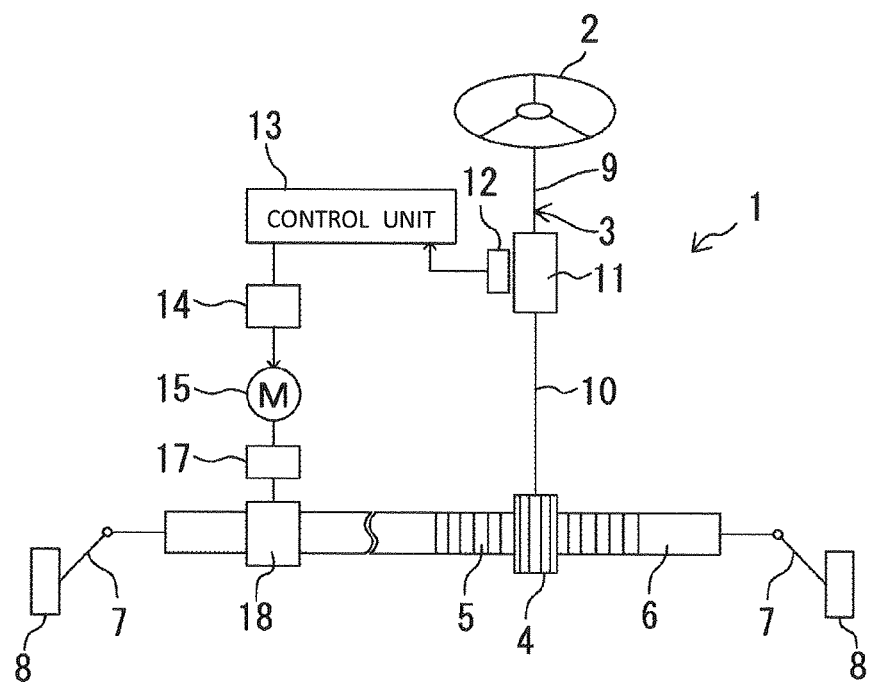
FIG. 1 depicts an example of schematic diagram showing an electric power steering device applied with a shaft structure as an embodiment of the present invention.

Explanations about the elements of an electric power steering device along with further explanations about the operation of such a device will be provided here. As shown in FIG. 1, the electric power steering device (EPS) (1) includes: a steering shaft (shaft) (3) connected to a steering wheel (2) as a steering component; and a rack shaft (6) having a pinion gear (4) disposed on an end of the steering shaft (3) and a rack gear (5) engaged with the pinion gear (4), where the rack shaft (6) can serve as a steering shaft extended in a lateral direction of the vehicle.

The rack shaft (6) has tie rods (7) connected to both ends thereof, respectively, and the tie rods (7) are connected to their respective wheels (8) through their respective knuckle arms (not shown). When the steering wheel (2) is manipulated so as to rotate the steering shaft (3), the rotational motion of the steering shaft (3) is converted by the pinion gear (4) and the rack gear (5) to the translational motion of the rack shaft (6) in a lateral direction of the vehicle. As a result, the steering of the wheels (8) can be thus achieved.

The steering shaft (3) is separated into an input shaft (9) connected to the steering wheel (2) and an output shaft (10) connected to the pinion gear (4). Such input/output shafts (9, 10) are coupled to each other via a torsion bar (11) along the same axis. Further, a torque sensor (12) is provided so as to detect steering torque on the basis of an amount of relative rotational displacement between the input and output shafts (9, 10) with respect to the torsion bar (11) interposed therebetween, and output torque-detection results obtained by the torque sensor (12) to a control unit (13). On the basis of: torque-detection results obtained by the torque sensor (12); vehicle-speed-detection results; and the like, the control unit (13) controls a driver (14) so as to adjust a voltage applied to an electric motor (15) for assistance in steering. Still further, the rotation of a rotary shaft (not shown) in the electric motor (15) is decreased in speed through a speed reducer (17). The outputted rotational motion of the speed reducer (17) is converted through a converter (18) to the translational motion of the rack shaft (6) in an axial direction, thereby resulting in assistance in steering. This electric power steering device (1) is that of the so-called rack assist type.

(Structure of Shaft Structure)

The shaft structure in an embodiment described above is applied, e.g., to the steering shaft (3) described above (hereinafter, occasionally referred to as "shaft (3)" for short).

Figure 2:
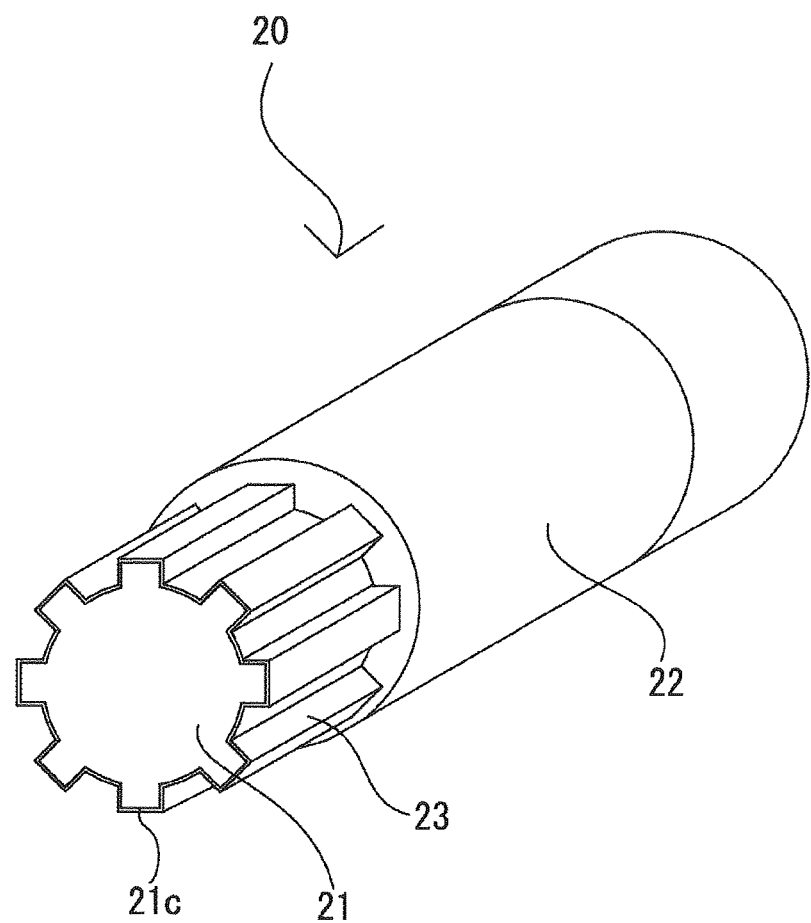
FIG. 2 depicts an example of perspective view showing a shaft structure as an embodiment.

The shaft structure (20) according to the present invention is installed on a shaft 3 capable of making a power-transmission. The male and female components capable of making a power-transmission are slidably fitted with respect to each other in an axial direction, thereby making up such a shaft structure (20). The shaft structure (20), as shown in FIG. 2, includes a metallic male component (21), a metallic female component (22), and a fabric (23) impregnated with rubber or other material.

Figure 3:
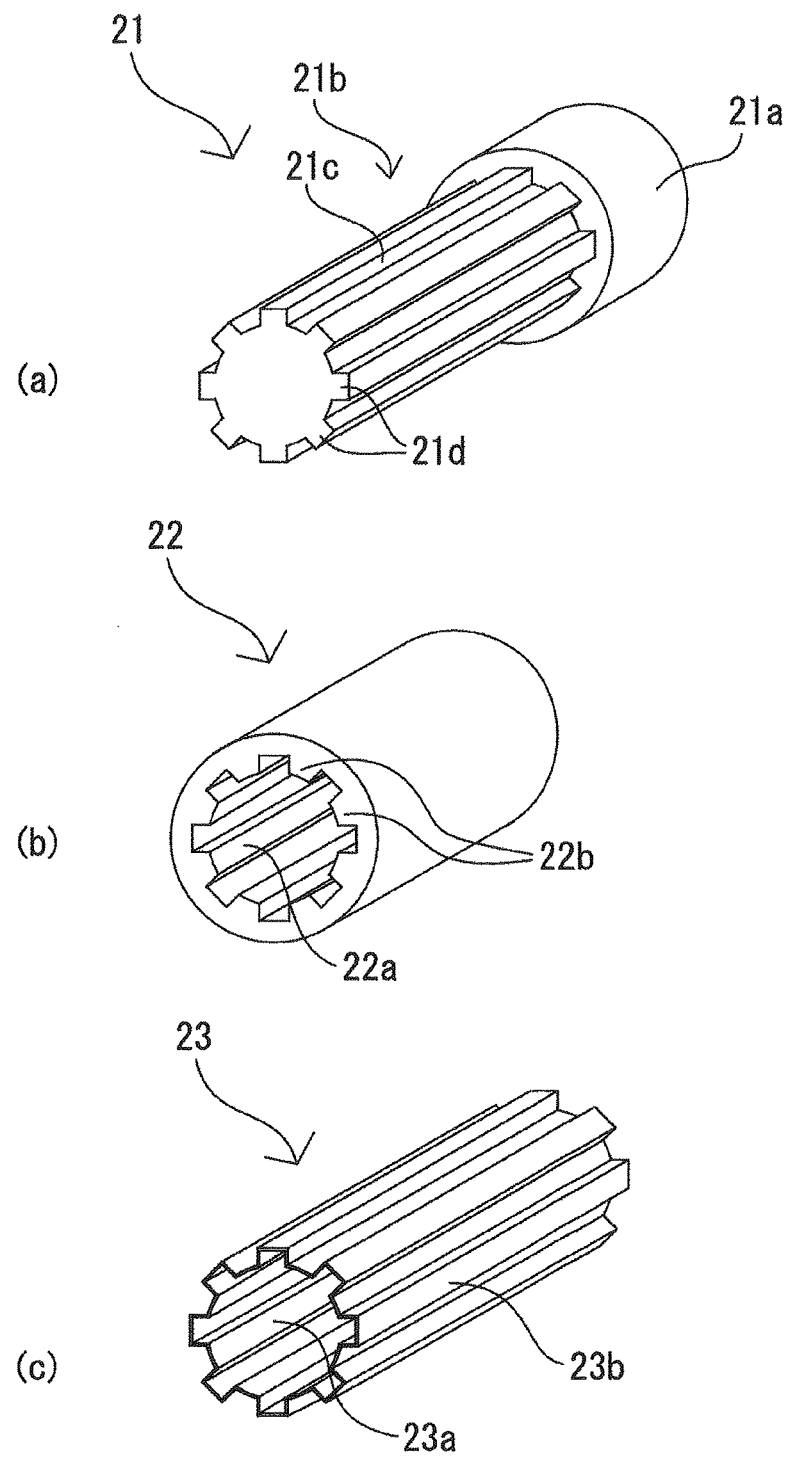
FIG. 3 depicts an exploded perspective view showing main parts of a shaft structure as an embodiment: (a) an example of a male component, (b) an example of a female component, and (c) an example of a fabric to be interposed between the male and female components.

The male component (21), as shown in (a) of FIG. 3, has a substantially cylindrical linchpin (21a) and a convex part (21b) projecting from the end of the linchpin (21a). The outer peripheral part (21c) of the convex part (21b) has, e.g., eight male splines (21d) positioned at predetermined intervals in a circumferential direction around the convex part (21b).

As shown in FIG. 3. the male salines 21d have a trapezoidal-shape structure.

The female component (22), as shown in (b) of FIG. 3, is formed into a substantially cylindrical shape and has an inner peripheral part (22a) configured such that the male component (21) can be inserted thereinto, and its outer peripheral part (21c) can be engaged therein. In other words, the inner peripheral part (22a) of the female component (22) has the structure of eight female splines (22b) (the number of the splines must be the same as that of the male splines on the convex part (21b) of the male component (21), therefore eight (8) in this embodiment) positioned at predetermined intervals in a circumferential direction around the female component (22). As shown in FIG. 3, the female splines (22b) have a trapezoidal-shaped structure.

The fabric (23) may be made of, e.g., aramid fiber, nylon, urethane, cotton, silk, linen, acetate, rayon, fluorine-containing fiber, polyester, and the like, which are impregnated with rubber or resin. The fabric (23) may be made of, e.g., short fibers or long fibers, and may also be sheet-like fabric.

By virtue of impregnating fibers with rubber or resin, rubber material or resin material is enabled to fill the gaps among the fibers and bond the fibers together, thereby allowing the fibers to serve as a component (sheet body) like a fabric (23). Further, by virtue of impregnating fibers with rubber or resin, the wear caused by friction between the fibers can be reduced, and still further, the resistance to wear on the surface of the fabric (23) caused by friction between the fabric (23) and the male component (21) or the female component (22) can be improved.

The rubber is required to be that with which the fibers can be impregnated. As such types of rubber, the followings may be used in a neat form or in a form denatured in various ways: e.g., urethane rubber, nitrile rubber, silicon rubber, fluororubber, acrylic rubber, ethylene-propylene rubber, butyl rubber, isoprene rubber, chlorinated polyethylene rubber, epichlorohydrin rubber, hydrogenated nitrile rubber, chloroprene rubber, polybutadiene rubber, styrene-butadiene rubber, natural rubber, and the like. Each of these types of rubber may be used alone, or a plurality of types of rubber selected therefrom may be used in a blended form. Further, the rubber may contain appropriate amounts of traditional compounding ingredients for rubber, such as vulcanizing agent, vulcanizing accelerator, antioxidant, softener, plasticizer, filler, colorant, and the like as well as solid lubricants such as graphite, silicone oil, fluorine powder, molybdenum disulfide, or the like for enhancing the lubricity of the fabric (23). Still further, the above types of rubber may be replaced by or combined with thermoplastic or thermosetting resin such as acrylic resin, polyester resin, urethane resin, vinyl chloride resin, polypropylene, polycarbonate, polyethylene terephthalate resin, fluorine resin, polyethylene, acrylonitrile-styrene resin, acrylonitrile-butadiene-styrene resin, polystyrene resin, polyvinyl chloride, polyvinylidene chloride, polyvinyl acetate, nylon, alkyd resin, phenolic resin, epoxy resin, polyphenylene sulfide resin, and the like.

When impregnating fibers with rubber or resin as described above, it is preferable that the rubber or resin be dissolved by a solvent or another means into a liquid state before dipping the predetermined fibers (short or long fibers) in the liquid. In practice, the sheet-like fabric made of the fibers may be used. This fabric is impregnated with rubber or resin in the same way as described above.

The fabric may be, e.g., non-woven fabric made of irregularly tangled fibers, regularly-formed woven, knitted fabric, or the like. These fabrics are characterized by facilitating impregnation (easier handling) with rubber and the like, and further facilitating adhesion to the surface of the shaft structure described below in comparison with those made of fibers (short or long fibers) only, because these fabrics are in sheet form. The woven fabric may be made in a plain weave, satin weave, twill weave, or the like.

The fabric may preferably be stretchy to some extent. By virtue of such stretchiness, when the fabric is formed so as to be in line with the female splines (22b) or male splines (21d) in shape, or when the fabric is adhered to a concave-convex surface of the outer peripheral part (21c) of the male component (21) and the inner peripheral part (22a) of the female component (22), there can be achieved the advantageous effects that: the surface of the fabric can easily be shaped in accordance with the concave-convex surface form; and the fabric (23) has the surface subjected to few creases and uniformly finished, thereby enabling smooth fitting between the male component (21) and the female component (22), and further enabling decrease in sliding resistance generated between: the male component (21) or the female component (22); and the fabric (23). By producing the fabric (23) in such a manner that a stretchiness direction of the fabric, in particular, can coincide with at least a circumferential direction of the cylindrically-shaped fabric (23), it becomes possible that the surface of the fabric (23) is subjected to fewer creases.

As shown in FIG. 2, the impregnation-processed fabric (23) is interposed between the outer peripheral part (21c) of the male component (21) and the inner peripheral part (22a) of the female component (22) (see (b) of FIG. 3). As shown in (c) of FIG. 3, the impregnation-processed fabric (23) has an inner surface (23a) substantially the same in shape as the outer peripheral part (21c) of the male component (21) (see (a) of FIG. 3), and has an outer surface (23b) substantially the same in shape as the inner peripheral part (22a) of the female component (22) (see (b) of FIG. 3). In this embodiment, as shown in (a) of FIG. 4, the impregnation-processed fabric (23) is adhered to the outer peripheral part (21c) of the male component (21). The adhesive used here may be, e.g., acrylic resin adhesive, olefin adhesive, urethane resin adhesive, ethylene-vinyl acetate resin adhesive, epoxy resin adhesive, vinyl chloride resin adhesive, chloroprene rubber adhesive, cyanoacrylate adhesive, silicon adhesive, styrene-butadiene rubber adhesive, nitrile rubber adhesive, hot-melt adhesive, phenolic resin adhesive, melamine resin adhesive, urea resin adhesive, resorcinol adhesive, and the like. There are methods to cure an adhesive for bonding: by heating an adhesive so as to cause the adhesive to melt as fluid, applying the melting adhesive, and thereafter cooling the applied adhesive; just by heating an adhesive; or the like.

In this embodiment, the impregnation-processed fabric (23) is disposed on an entire circumference of the outer peripheral part (21c) of the male component (21). As illustrated in FIG. 2, the male component (21) adhered with the fabric (23) has a tip projecting from one end of the female component (22) in an axial direction. The tip of the male component (21) is processed appropriately in accordance with circumstances that the shaft structure (20) is used.

The shaft structure (20) can be manufactured by sequentially performing the steps of, e.g.: cutting the male and female components (21, 22) having their respective shapes as shown in (a), (b) of FIG. 3 from metal material (not shown); impregnating the fabric (23) with rubber or the like; and interposing the impregnation-processed fabric (23) between the outer peripheral part (21c) of the male component (21) and the inner peripheral part (22a) of the female component (22).

Further, regarding a method of manufacturing the fabric (23), the following may be appropriately selected. In order to form the fabric (23) shown in, e.g., (c) of FIG. 3, inner and outer molds for forming the inner and outer surfaces (23a, 23b), respectively, are prepared. It is a matter of course that the outer surface of the inner mold and the inner surface of the outer mold have a concave-convex form corresponding to the inner and outer surfaces (23a, 23b), respectively. Fibers (short fibers, long fibers, or sheet-like fabric) impregnated with rubber or resin are stuffed between the inner and outer molds, and thereafter the stuffed fibers are pressed and heated through the molds. Subsequently, the fibers are removed from between the molds. Still subsequently, fabrics (23) having inner and outer surfaces (23a, 23b) molded can be obtained.

Still further, regarding an alternative method of manufacturing the fabric (23), it may also be formed by: initially making a fabric supposed to fill a gap between an inner mold and an outer mold into a cylindrical shape in accordance with an outer shape of the inner mold; subsequently disposing the cylindrically-shaped fabric on the inner mold in accordance with the outer shape of the inner mold; and thereafter pressing and heating the fabric placed on the inner mold in a similar manner to the above. In this case, the stretchiness of the fabric enables the fabric (23) to be formed further in accordance with the concave-convex form of the inner and outer molds. As a result, the formed fabric (23) having the inner and outer surfaces (23a, 23b) subjected to no creases and uniformly finished can be manufactured. The fabric (23) with such uniformly finished surfaces interposed between the male and female components (21, 22) of the shaft structure (20) can result in further decrease in sliding resistance in an axial direction. By forming the fabric into a cylindrical shape in such a manner that a stretchiness direction of the fabric to be formed is aligned at least with a circumferential direction of the formed fabric (23) in a cylindrical shape, the occurrence of creases can be further reduced.

The male component (21) having the outer peripheral part (21c) adhered with the impregnation-processed fabric (23) as shown in (a) of FIG. 4 can be manufactured by performing the following steps, on condition that "the inner mold" in the above-described manufacturing method is replaced with "the male component (21)": the step of applying adhesive on a metal surface of the male component (21); the step of subsequently filling fibers (short fibers, long fibers, or sheet-like fabric) impregnated with rubber or resin between the male component (21) and the outer mold; the step of still subsequently pressing and heating the fibers through the outer mold; and thereafter the step of removing the outer mold, thereby obtaining the male component (21) having the outer peripheral part (21c) adhered with the fabric (23) as shown in (a) of FIG. 4. In a similar manner to the above, as an alternative method, the component shown in (a) of FIG. 4 may be obtained by: initially making a fabric into a cylindrical shape in accordance with an outer shape of the male component (21); subsequently disposing the cylindrically-shaped fabric on the male component (21) in accordance with the outer shape thereof; and thereafter pressing the fabric placed on the male component (21). According to such a method, by virtue of the stretchiness of the fabric, the surface of the fabric (23) adhered to the outer peripheral part (21c) of the male component (21) is resistant to the generation of creases, and is uniformly finished, which results in still further decrease in sliding resistance in an axial direction between the male and female components (21, 22) of the shaft structure (20). By forming the fabric (23) into a cylindrical shape in such a manner that a stretchiness direction of the fabric to be formed is aligned at least with a circumferential direction of the male component (21), the occurrence of creases can be further reduced as described above.

EXAMPLES

Next, the present invention will be specifically explained with reference to examples. The following descriptions are provided for the results of material tests prescribed in Japanese Industrial Standards (JIS) for examining the usefulness of the fabric (23) in an embodiment (see FIG. 2) as a buffer member. It is to be noted that the present invention shall not be limited to this example. More specifically, the inventors have conducted the Pico abrasion test (JIS K 6264-2) as well as the friction coefficient measurement test (JIS K 7125) using a Heidon tester to compare between nylon 66 impregnated with nitrile rubber and single-component rubber material made of nitrile rubber (hardness 70, JIS K 6253, Type A Durometer).

Table 1 below shows the results of the Pico abrasion test, and Table 2 below shows the results of the friction coefficient measurement test. In Tables 1, 2, the item "Rubber-impregnated" denotes material contained in the fabric (23) in this embodiment, more specifically, the nylon 66 impregnated with nitrile rubber, and the item "Single-component rubber" denotes the single-component rubber material made of nitrile rubber for comparison with the material contained in the fabric (23) in this embodiment.

TABLE 1

| Abrasion loss | |
| --- | --- |
| Rubber-impregnated | 2.2 mg |
| Single-component rubber | 9.9 mg |

TABLE 2

| Friction coefficient | |
| --- | --- |
| Rubber-impregnated | 0.54 |
| Single-component rubber | 1.48 |

As shown in Table 1, the abrasion loss is 2.2 mg in the nylon 66 impregnated with nitrile rubber, and is 9.9 mg in the single-component rubber material made of nitrile rubber. It is therefore found that the abrasion loss can be reduced to approximately one-fifth in the nylon 66 impregnated with nitrile rubber as compared to the single-component rubber material.

As shown in Table 2, the friction coefficient is 0.54 in the nylon 66 impregnated with nitrile rubber, and is 1.48 in the single-component rubber material made of nitrile rubber. It is found therefore that the friction coefficient can be reduced to approximately one-third in the nylon 66 impregnated with nitrile rubber as compared to the single-component rubber material.

These results demonstrate the superiority of the nylon 66 impregnated with nitrile rubber as a buffer. More specifically, the results show that the single-component rubber material formed on the outer peripheral part (21c) of the male component (21) can indeed reduce the tooth-hit noise generated between the male and female components (21, 22), while increases the sliding resistance (the friction coefficient is increased). Meanwhile, the fabric (23) containing the nylon 66 impregnated with nitrile rubber formed on the outer peripheral part (21c) of the male component (21) can reduce the sliding resistance (the friction coefficient is decreased more than that of the single-component rubber material formed on the outer peripheral part (21c) of the male component (21)), and can improve the durability (the abrasion loss is decreased further than that of the single-component rubber material formed on the outer peripheral part (21c) of the male component (21)).

(Features of Shaft Structure in Embodiment)

According to the above construction, by virtue of interposing the fabric (23) impregnated with rubber or the like between the outer peripheral part (21c) of the male component (21) and the inner peripheral part (22a) of the female component (22), not only unpleasant tooth-hit noise generated therebetween can be reduced, but also sliding resistance in an axial direction between the male and female components (21, 22) can be decreased, both of which reduction/decrease are trade-off related to each other. Further, by virtue of the improvement of slidability between the male and female components (21, 22) in an axial direction, the need for lubrication between the outer peripheral part (21c) of the male component (21) and the inner peripheral part (22a) of the female component (22) can be eliminated, and expense in time and effort can be saved with respect to the need for lubricant supply. Still further, by virtue of impregnating the fabric (23) with rubber or resin, the resistance to wear on the surface of the fabric (23) caused by friction between the fabric (23) and the outer peripheral part (21c) of the male component (21) or between the fabric (23) and the inner peripheral part (22a) of the female component (22) can be improved.

Figure 4:
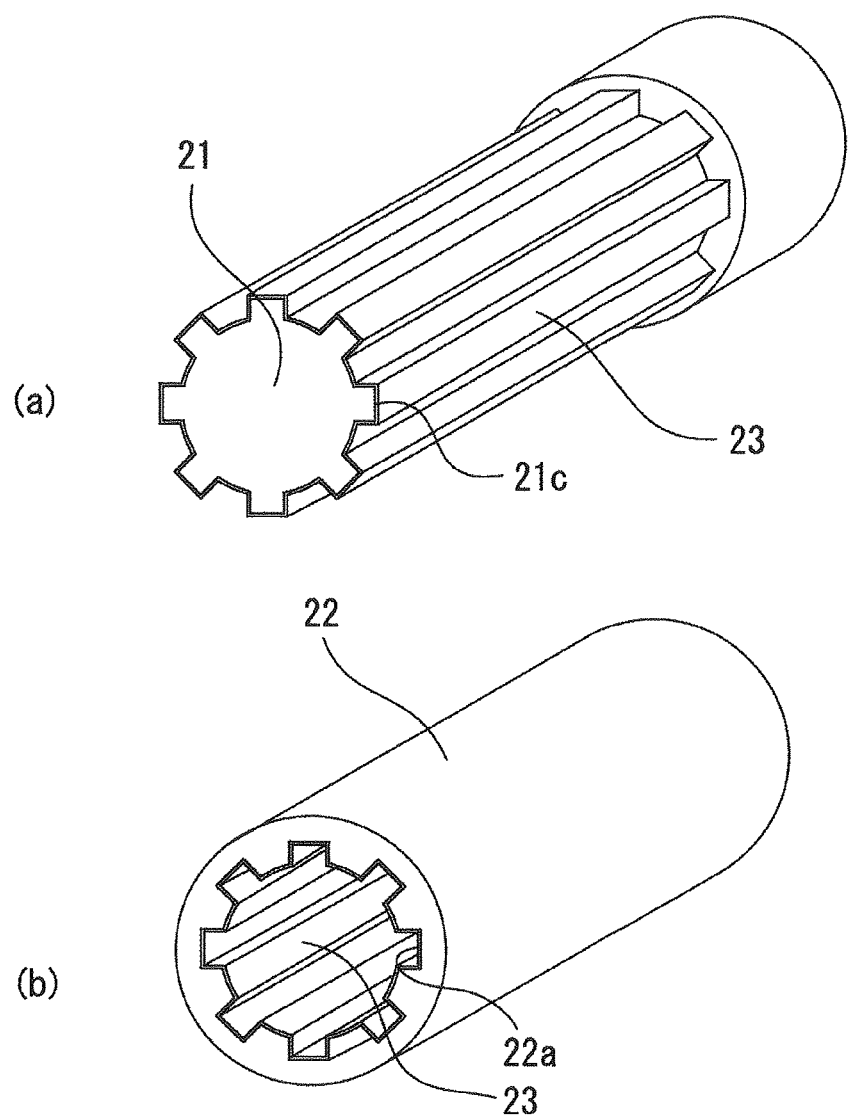
FIG. 4 depicts a perspective view showing modified examples of an embodiment: (a) an example of a male component attached with a fabric such that the fabric is adhered on an outer peripheral part of the male component with glue, and (b) an example of a female component attached with a fabric such that the fabric is adhered on an inner peripheral part of the female component with glue.

Means for interposing the rubber-impregnated fabric (23) between the outer peripheral part (21c) of the male component (21) and the inner peripheral part (22a) of the female component (22) are not limited to one sort of means shown in (a) of FIG. 4, by which the fabric (23) impregnated with rubber is adhered to the outer peripheral part (21c) of the male component (21). Another sort of means available is shown in (b) of FIG. 4, by which the fabric (23) impregnated with rubber is adhered to the inner peripheral part (22a) of the female component (22). In other words, as long as rubber-impregnated fabric (23) and metal are configured such that they can slide with respect to each other, the above-described advantageous effects can be achieved by either of the above two sorts of means. The rubber-impregnated fabric (23) can be adhered to the outer peripheral part (21c) of the male component (21) or the inner peripheral part (22a) of the female component (22) by: forming a rubber layer on a rear surface (a surface to be adhered to the outer peripheral part (21c) of the male component (21) or the inner peripheral part (22a) of the female component (22)) of the rubber-impregnated fabric (23) such that the rubber layer is integrated with the fabric (23); and subsequently adhering the rubber layer with adhesive to a metal surface (a surface of the outer peripheral part (21c) of the male component (21) or the inner peripheral part (22a) of the female component (22)), for example. According to such means, the adhesion between the fabric (23) and the metal surface can be strengthen.

Specific constructions according to the present invention are not limited to the above embodiments described above with reference to the drawings. The scope of the present invention is not encompassed by the above explanations of the embodiment but particularly pointed out by the claims, and the equivalents of the claim recitations as well as all the modifications within the scope of the claims fall within the scope of the present invention. Two modified examples 1, 2 will be provided below.

Modified Example 1

Figure 5:
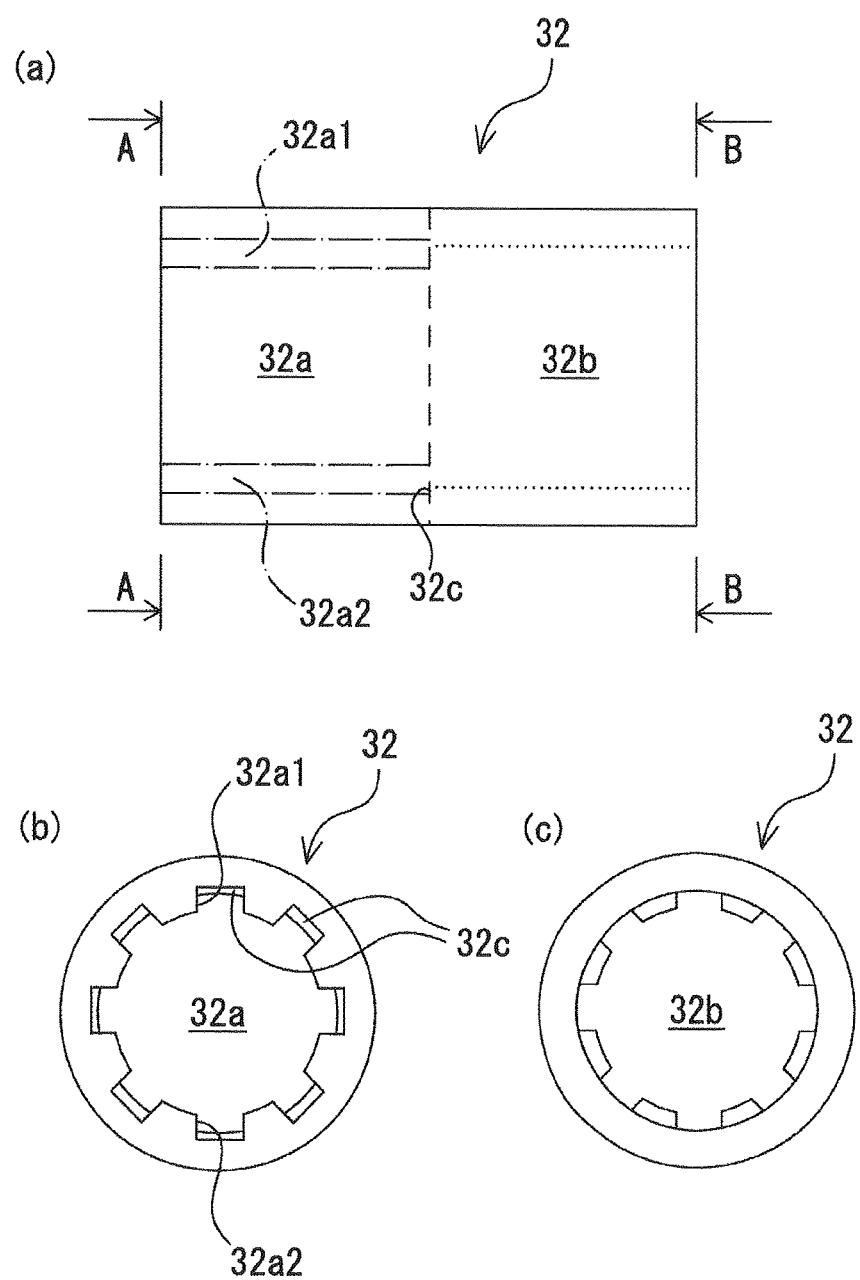
FIG. 5 depicts views showing modified example 1 of a female component in an embodiment: (a) a side view; (b) a view taken along an arrowed line A-A of (a); and (c) a view taken along an arrowed line B-B of (a).

The female component (22) in the above embodiment may be replaced by a female component (32) shown in FIG. 5 ((a) a side view; (b) a view taken along an arrowed line A-A of (a); and (c) a view taken along an arrowed line B-B of (a)). Hereinafter, the female component (32) will be specifically described. Note that, in (a) of FIG. 5, a transparent view is provided only for the parts (32a1, 32a2) by using a dashed-dotted line for convenience in the illustration.

The female component (32) includes a first hole (32a), a second hole (32b), and a movement stopper (32c) (first movement stopper). The first hole (32a) is configured such that, when a male component like the male component (21) in the above embodiment is inserted into the first hole (32a), the male component slidably fits in the inner peripheral part of the first hole (32a) (e.g., parts 32a1 and 32a2) along the first hole (32a), and the male component is caused by the movement stopper (32c) to stop moving before or at a predetermined position (at a bottom of the first hole (32a)). A fabric like the fabric (23) in the above embodiment is interposed between the male component and the first hole (32a). The second hole (32b) is configured in a cylindrical shape such that a rod-shaped component (not shown) having a predetermined diameter can be pressed in and fixed to the second hole (32b).

According to the above construction, the female component (32) can be used as a component for connecting (coupling) the male component, which is the same in sort as the male component (21), and the rod-shaped component. The movement stopper (32c) in particular enables the female component (32) itself to be positioned between the male component and the rod-shaped component.

Modified Example 2

Figure 6:
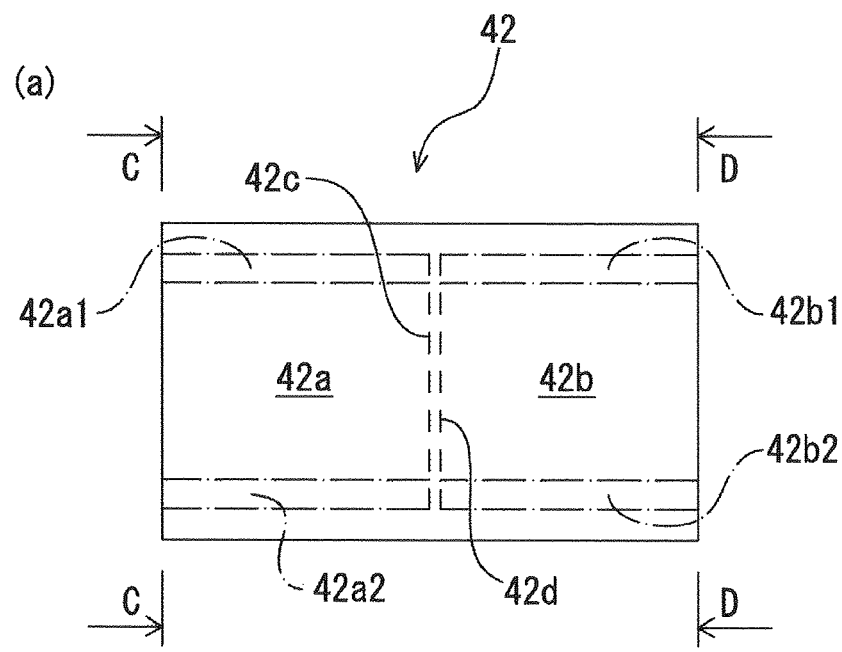
FIG. 6 depicts views showing modified example 2 of a female component in an embodiment: (a) a side view; (b) a view taken along an arrowed line C-C of (a); and (c) a view taken along an arrowed line D-D of (a).
Figure 6:
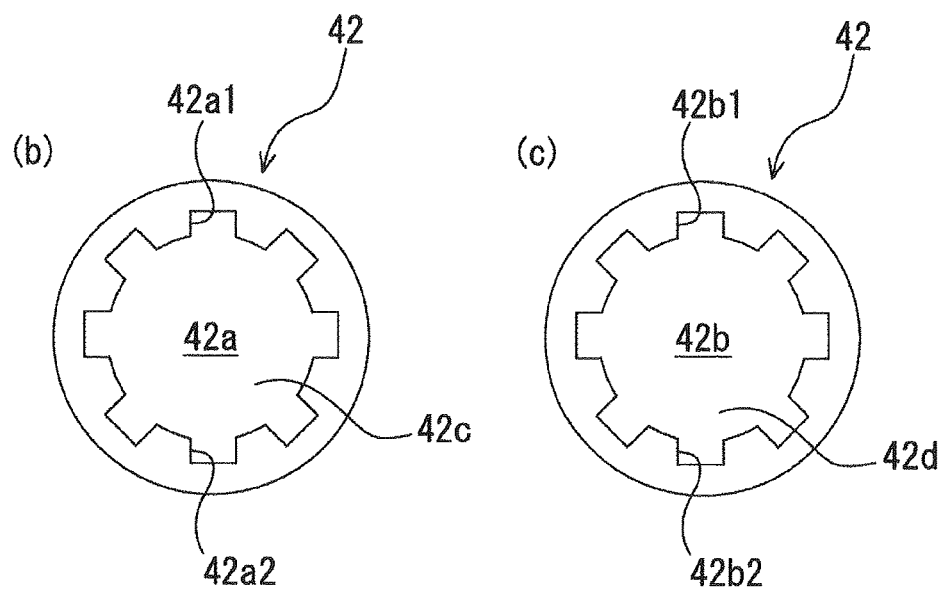

The female component (22) in the above embodiment may be replaced by a female component (42) shown in FIG. 6 ((a) a side view; (b) a view taken along an arrowed line C-C of (a); and (c) a view taken along an arrowed line D-D of (a)). Hereinafter, the female component (42) will be specifically described. Note that, in (a) of FIG. 6, a transparent view is provided only for the parts (42a1, 42a2, 42b1, 42b2) by using a dashed-dotted line for convenience in illustration.

The female component (42) includes a third hole (42a), a fourth hole (42b), a movement stopper (42c) (second movement stopper), and a movement stopper (42d) (third movement stopper). The third hole (42a) is configured such that, when a male component like the male component (21) in the above embodiment is inserted into the third hole (42a), the male component slidably fits in the inner peripheral part of the third hole (42a) (e.g., parts 42a1 and 42a2) along the third hole (42a), and the male component is caused by the movement stopper (42c) to stop moving before or at a predetermined position (at a bottom of the third hole (42a)).

A fabric like the fabric (23) in the above embodiment is interposed between the male component and the third hole (42a). The fourth hole (42b) is configured such that, when another male component (not shown) like the male component (21) in the above embodiment is inserted into the fourth hole (42b), the male component slidably fits in the inner peripheral part of the fourth hole (42b) (e.g., parts 42b1 and 42b2) along the fourth hole (42a), and the male component is caused by the movement stopper (42d) to stop moving before or at a predetermined position (at a bottom of the fourth hole (42b)). A fabric like the fabric (23) in the above embodiment is interposed between the male component and the fourth hole (42b).

According to the above construction, the female component (42) can be used as a component for connecting (coupling) the male component, which is the same in sort as the male component (21), and another male component. The movement stoppers (42c, 42d) in particular enable the female component (42) itself to be positioned between the male component, which is the same in sort as the male component (21), and the above-described another male component.

Regarding further modified examples, although the shaft structures in the above embodiments and modified examples 1, 2 are applied to the steering shafts for vehicles, the present invention can be applied not only to such shafts in a limitative manner but also to shafts used for various industrial machines.

In the above embodiments and modified examples 1, 2, there is described an example of impregnating fibers with rubber or the like; however, the present invention shall not be limited to such an example, and the fibers are required to be those which can be impregnated with rubber or the like and which have low sliding resistance against the metal surface, and sheet-like fabric made of fibers may be used. For example, canvas, velvet, denim, woven fabric, knitted fabric impregnated with rubber or the like may be used. Horizontally and/or vertically stretchy fabric may also be used.

In the modified examples 1, 2, each movement stopper at the bottom of each hole; however, the movement stoppers may be arranged anywhere in the holes as long as they can stop the movement of the male component before or at a predetermined position (arbitrarily defined positions) in the holes so as to determine the position of the female component.

REFERENCE NUMERALS

1 Electric power steering device
2 Steering wheel
3 Steering shaft (shaft)
4 Pinion gear
5 Rack gear
6 Rack shaft
7 Tie rod
8 Wheel
9 Input shaft
10 Output shaft
11 Torsion bar
12 Torque sensor
13 Control unit
14 Driver
15 Electric motor
17 Speed reducer
18 Converter
20 Shaft structure
21 Male component
22, 32, 42 Female component
21a Linchpin
21b Convex part
21c Outer peripheral part
21d Male splines
22a Inner peripheral part
22b Female splines
23 Woven fabric (fibers)
23a Inner surface
23b Outer surface
32a First hole
32b Second hole
32c Movement Stopper (first movement stopper)
42a Third hole
42b Fourth hole
42c Movement stopper (second movement stopper)
42d Movement stopper (third movement stopper)

What is claimed is:

1. A shaft structure installed in a shaft capable of making a power-transmission, the shaft structure comprising:
    a metallic male component having a plurality of male splines formed on an outer peripheral part thereof;
    a metallic female component having a plurality of female splines formed on an inner peripheral part thereof, the inner peripheral part configured to allow the outer peripheral part of the male component to be engaged therein so that the male component and the female component can be slidably fitted with respect to each other in an axial direction thereby making up said shaft structure; and
    a cylindrically-shaped member having an inner surface substantially the same in shape as the outer peripheral part of the male component and an outer surface substantially the same in shape as the inner peripheral part of the female component, the cylindrically-shaped member interposed between the outer peripheral part of the male component and inner peripheral part of the female component, the inner surface of the cylindrically-shaped member mating with, and extending around, an entire periphery of the outer peripheral part of the male component, and the outer surface of the cylindrically-shaped member mating with, and extending around, an entire periphery of the inner peripheral part of the female component, the cylindrically-shaped member comprising a fabric made up of fibers that have been impregnated with a rubber such that the fibers have gaps thereamong filled with the rubber so as to be bonded together by the rubber, wherein
    the cylindrically-shaped member is interposed between the outer peripheral part and the inner peripheral part while being adhered to one of the outer peripheral part of the male component and the inner peripheral part of the female component as well as being slidable with respect to the other of the outer peripheral part of the male component and the inner peripheral part of the female component, and wherein
    the cylindrically-shaped member is configured such that the fabric thereof has stretchiness at least in a circumferential direction thereby reducing occurrence of creases.

2. The shaft structure of claim 1 wherein each of the plurality of female splines has a trapezoidal-shaped structure.

3. A metallic male component, fitted in a metallic female component, installed in a shaft capable of making a power-transmission, the male component comprising:

a plurality of male splines formed on an outer peripheral part, the outer peripheral part of said male component configured to be engaged in an inner peripheral part of the female component so that said male component can be slidably fitted in the female component in an axial direction; and a cylindrically-shaped member having an inner surface substantially the same in shape as the outer peripheral part of said male component, the cylindrically-shaped member disposed on the outer peripheral part of said male component, wherein, when said male component is fitted in the female component, the cylindrically-shaped member is interposed between the outer peripheral part and the inner peripheral part while being adhered to one of the outer peripheral part of said male component and the inner peripheral part of the female component as well as being slidable with respect to the other of the outer peripheral part of said male component and the inner peripheral part of the female component, the inner surface of the cylindrically-shaped member mating with, and extending around, an entire periphery of the outer peripheral part of said male component, and an outer surface of the cylindrically-shaped member mating with, and extending around, an entire periphery of the inner peripheral part of the female component, the cylindrically-shaped member comprising a fabric made up of fibers that have been impregnated with a rubber such that the fibers have gaps thereamong filled with the rubber so as to be bonded together by the rubber , wherein the cylindrically-shaped member is configured such that the fabric thereof has stretchiness at least in a circumferential direction thereby reducing occurrence of creases.

4. A metallic female component, fitted to a metallic male component, installed in a shaft capable of making a power-transmission, the female component comprising:

a plurality of female splines formed on an inner peripheral part, the inner peripheral part of said female component configured to be engaged to an outer peripheral part of the male component so that said female component can be slidably fitted to the male component in an axial direction; and a cylindrically-shaped member having an outer surface substantially the same in shape as the inner peripheral part of said female component, the cylindrically-shaped member disposed on the inner peripheral part of said female component, wherein, when said female component is fitted to the male component, the cylindrically-shaped member is interposed between the outer peripheral part and the inner peripheral part while being adhered to one of the outer peripheral part of the male component and the inner peripheral part of said female component as well as being slidable with respect to the other of the outer peripheral part of the male component and the inner peripheral part of said female component, the outer surface of the cylindrically-shaped member mating with, and extending around, an entire periphery of the inner peripheral part of said female component, and an inner surface of the cylindrically-shaped member mating with, and extending around, an entire periphery of the outer peripheral part of the male component, the cylindrically-shaped member comprising a fabric made up of fibers that have been impregnated with a rubber such that the fibers have gaps thereamong filled with the rubber so as to be bonded together by the rubber, wherein the cylindrically-shaped member is configured such that the fabric thereof has stretchiness at least in a circumferential direction thereby reducing occurrence of creases.

5. The female component according to claim 4 further comprising:

a first hole formed on one side of said female component configured to allow the male component to be inserted thereinto in an axial direction; and a second hole formed on the other side of said female component configured to allow a rod-shaped component to be pressed therein in an axial direction and fixed thereto, wherein the first hole has a first movement stopper disposed therein, the first movement stopper configured to cause the male component to stop moving in an insertion direction before or at a predetermined position when the male component is inserted into the first hole.

6. The female component according to claim 4 further comprising:

a third hole formed on one side of said female component configured to allow the male component to be inserted thereinto in an axial direction; and a fourth hole formed on the other side of said female component configured to allow another male component different from the male component to be slidably fitted therein in an axial direction, wherein the third hole has a second movement stopper disposed therein, the second movement stopper configured to cause the male component to stop moving in an insertion direction before or at a predetermined position when the male component is inserted into the third hole, and the fourth hole has a third movement stopper disposed therein, the third movement stopper configured to cause said another male component to stop moving in an insertion direction before or at a predetermined position when said another male component is inserted into the fourth hole.

7. The female component according to claim 4 wherein each of the plurality of female splines has a trapezoidal-shaped structure.

8. A method for fabricating a shaft structure installed in a shaft capable of making a power-transmission, the method comprising:

providing a metallic male component having a plurality of male splines formed on an outer peripheral part thereof;

providing a metallic female component having a plurality of female splines formed on an inner peripheral part thereof, the inner peripheral part configured to allow the outer peripheral part of the male component to be engaged therein so that the male component and the female component can be slidably fitted with respect to each other in an axial direction thereby making up said shaft structure;

fabricating a cylindrically-shaped member from a fabric made up of fibers that have been impregnated with a rubber, whose gaps thereamong have been filled with the rubber, by dipping the fibers in the rubber in a liquid state;

forming the cylindrically-shaped member to have an inner surface substantially the same in shape as the outer peripheral part of the male component and an outer surface substantially the same in shape as the inner peripheral part of the female component; and interposing the cylindrically-shaped member between the outer peripheral part of the male component and inner peripheral part of the female component, such that the inner surface of the cylindrically-shaped member mates with, and extends around, an entire periphery of the outer peripheral part of the male component, and the outer surface of the cylindrically-shaped member mates with, and extends around, an entire periphery of the inner peripheral part of the female component, wherein the cylindrically-shaped member is adhered to one of the outer peripheral part and the inner peripheral part as well as is slidable with respect to the other of the outer peripheral part and the inner peripheral part, and wherein the cylindrically-shaped member is configured such that the fabric thereof has stretchiness at least in a circumferential direction thereby reducing occurrence of creases.

* * * * *